United States Patent [19]

Malugani et al.

[11] 4,331,750
[45] May 25, 1982

[54] ALKALINE CATION CONDUCTIVE VITREOUS COMPOSITION AND A METHOD OF PREPARING SUCH A COMPOSITION

[75] Inventors: Jean-Pierre Malugani, Besancon; Guy Robert, Morre, both of France

[73] Assignee: Societe Anonyme dite: GIPELEC, Levallois Perret, France

[21] Appl. No.: 226,404

[22] Filed: Jan. 19, 1981

[30] Foreign Application Priority Data

Feb. 29, 1980 [FR] France ............................... 80 04547

[51] Int. Cl.$^3$ ............................................ H01M 6/18
[52] U.S. Cl. .................................. 429/193; 429/199; 501/40
[58] Field of Search ...................... 106/47 R; 252/62.2; 204/195 S; 429/30, 103, 104, 193, 199; 423/303; 501/40

[56] References Cited

U.S. PATENT DOCUMENTS 4,049,879  9/1977  Thompson ........................... 423/303

FOREIGN PATENT DOCUMENTS 2341953 of 0000 France .
2387192 of 0000 France .

OTHER PUBLICATIONS

R. A. Huggins, "Recent Results On Lithium Ion Conductors," Electro chimica Acta, vol. 22, pp. 773–781 (Pergamon Press, G. Brit.).

Y. Kawamoto et al., "Silver Diffusion in $As_2S_3$–$Ag_2S$, $GeS_2$–$GeS$–$Ag_2S$, and $P_2S_5$–$Ag_2S$ Glasses," Physics and Chemistry of Glasses, vol. 18, No. 1, pp. 19–23, Feb. 1977.

M. Ribes et al., "Synthese, Structure, et Conduction Ionique de Nouveaux Verres a Base de Sulfures," Revue de Chimie Minerale, t. 16.0979, p. 339 [vol. 16, No. 4, Sep. 1979].

Primary Examiner—Mark Bell
Attorney, Agent, or Firm—Kenyon & Kenyon

[57] ABSTRACT

A cation conductive vitreous alkaline composition and a method of preparing such a composition.

The composition corresponds to a formula of $aP_2S_5$, $bLi_2S$, $cLiX$, where:
X represents chlorine, bromine or iodine;
c is greater than or equal to 0;
the ratio $b/(a+b)$ lies between 0.61 and 0.70; and
the ratio $c/(a+b+c)$ is less than or equal to a limit which corresponds to solubility in the vitreous phase of LiX in the composition $aP_2S_5$, $bLi_2S$.

6 Claims, 1 Drawing Figure

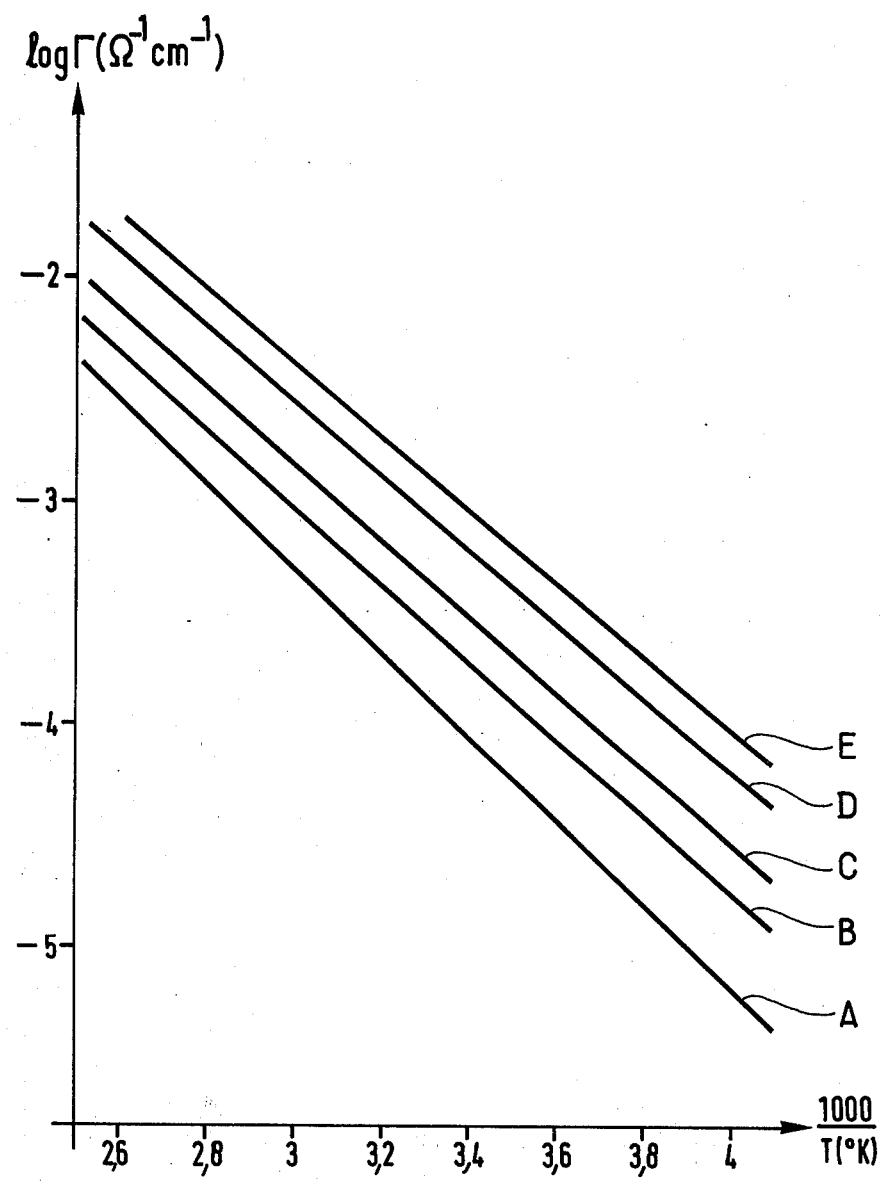

ALKALINE CATION CONDUCTIVE VITREOUS COMPOSITION AND A METHOD OF PREPARING SUCH A COMPOSITION

FIELD OF THE INVENTION

The invention relates to a vitreous composition which conducts alkaline cations, said compound being used as a solid cation electrolyte; the invention also relates to a method of preparing such a composition.

BACKGROUND OF THE INVENTION

Solid electrolytes are used in various electrochemical units such as electric cells and display devices. Their advantage over liquid electrolytes is that they simplify technological problems which arise in use, and in particular problems concerning sealing. Unfortunately known solid electrolytes which conduct alkaline cations have relatively low conductivity at temperatures lower than 100° C. so that the performance of electric cells which contain such electrolytes is very much lower than that of electric cells with a liquid electrolyte.

The use of various vitreous compositions that conduct cations has already been recommended, these compositions being included in the general formula $aA_mY_n$, $bM_2Y$, $cMX$, where:
- A represents boron, silicon, germanium or phosphorus;
- Y represents oxygen or sulphur;
- M represents lithium or sodium; and
- X represents chlorine, bromine or iodine and c can be equal to or greater than zero.

The conductivity at 25° C. of all compositions of this type known up to now is less than $10^{-5} \Omega^{-1} cm^{-1}$.

The present invention aims to provide a cation-conductive vitreous composition which is more conductive at ordinary temperatures.

SUMMARY OF THE INVENTION

The invention provides a cation conductive vitreous composition of general formula $aP_2S_5$, $bLi_2S$, $cLiX$ where X is an element chosen from the group consisting of chlorine, bromine and iodine and where a, b and c are numbers chosen so that the ratio $b/(a+b)$ lies in the range 0.61 to 0.70 and the ratio $c/(a+b+c)$ is less than or equal to a limit value corresponding to the maximum solubility in the vitreous phase of LiX in the composition $aP_2S_5$, $bLi_2S$.

Therefore, the composition in accordance with the invention differs from previous ones in particular by the following details:
- simultaneously, we have Y=S and M=Li; and
- the ratio b:a is close to 2 where A=P Unexpectedly, conductivity at 25° C. is then about $10^{-4} \Omega^{-1} cm^{-1}$ where c=0 and even higher where c>0. If X is bromine, said limit value of the ratio $c/(a+b+c)$ is about 0.20. For iodine, it reaches about 0.50.

The invention also provides a method of preparing the above composition, the method comprising melting together the compounds $P_2S_5$, $Li_2S$ and, if need be, LiX at a temperature which lies between 700° and 950° C., followed by tempering and then by annealing at a temperature of about 100°.

This method can include incorporating a quantity of LiX in the melt exceeding its solubility in the glass so as to obtain an intimate mixture of glass saturated with LiX and of crystallized LiX.

BRIEF DESCRIPTION OF THE DRAWING

The invention will be better understood from the description of embodiments given hereinafter by way of nonlimiting illustration with reference to the accompanying drawing in which the sole FIGURE shows conductivity curves of compositions in accordance with the invention as a function of temperature.

DESCRIPTION OF PREFERRED EMBODIMENTS

EXAMPLE 1

1 part of $P_2S_5$ and 2 parts of $Li_2S$ in powder form are mixed together in a silica phial under a dehydrated argon atmosphere. The parts are measured in moles. The phial is sealed under a vacuum of $1.33 \times 10^{-5}$ bars and is heated to about 900° C. for 10 minutes. The melted mixture is slowly cooled to 700° C. then tempered at ambient temperature and then annealed at 100° C. Glass with a formula of $P_2S_5, 2Li_2S$, i.e. a ratio of $b/(a+b)=(\frac{2}{3})$ is thereby obtained.

The variation in the conductivity of this glass as a function of temperature is shown by curve A in the FIGURE, which curve represents the decimal logarithm of the conductivity $\Gamma$ in $\Omega^{-1}cm^{-1}$ as a function of 1000/T; where T is the temperature in degrees Kelvin. Conductivity at 25° C. is $10^{-4} \Omega^{-1} cm^{-1}$.

An electric cell was prepared, with a 1 mm thick disk of this glass between a negative lithium electrode and a positive electrode which included 50% of $PbI_2$ and 50% of lead by weight. The voltage of this cell is 2.1-volts.

EXAMPLES 2 TO 5

The process of example 1 is repeated with mixtures of powders which always have a molar ratio of $Li_2S/P_2S_5$ equal to 2, $(b/[a+b]=\frac{2}{3})$, but further containing LiI at molar fractions $(c/[a+b+c])$ of 0.15, 0.25, 0.40 and 0.45 respectively for examples 2 to 5. The conductivities of glass obtained are given by curves B, C, D and E in the FIGURE. In particular, the conductivity at 25° of glass containing 45% LiI is $10^{-3} \Omega^{-1} cm^{-1}$, i.e. more than 100 times higher than that of known cation-conductive glasses.

EXAMPLE 6

The same process is applied using, for 1 mole of $P_2S_5$, 2 moles of $Li_2S$ and 0.75 moles of LiBr, i.e. a molar ratio of 0.2 for LiBr. The conductivity at 25° C. of this glass is $1.4 \times 10^{-4} \Omega^{-1} cm^{-1}$.

The molar fraction 0.2 corresponds to the maximum solubility of LiBr in the vitreous phase, whereas this limiting ratio is substantially equal to 0.5 for LiI. If these ratios are exceeded, a mixture is obtained of glass saturated with LiX and of crystallized LiX, in which mixture the crystallized LiX performs the function of a binder and facilitates the use of solid electrolyte. Further, the glass contained in the mixture has optimum conductivity since, as shown by the curves in the FIGURE, conductivity is an increasing function of the rate of LiX.

As for the molar ratio of $Li_2S/P_2S_5$, it may be different from the value 2 without loss of homogeneity, and vary between 1.56 and 2.33 corresponding respectively to 0.61 and 0.70 for $b/(a+b)$ in the formula $aP_2S_5$, $bLi_2S$, $cLiX$.

The ingredients can be melted at any temperature between 700° C. and 950° C. However, glass obtained at a relatively high temperature, e.g. 900° C., is clearer than that obtained at a lower temperature. Slow cooling down to 700° C. makes it possible to combine all of the $P_2S_5$ whose vapour pressure is relatively high at 900° C.

The glasses in accordance with the invention can be used as solid electrolytes in lithium cells whose active material is, for example, $MoO_3$, $WO_3$, $TiS_2$, $NiPS_3$ or a bismuthate of copper or lead.

Because of their fragility, the glasses are preferably used in the form of plates sintered from a compressed powder obtained by crushing the glass. However, the relatively low softening temperature of the glasses in accordance with the invention (about 140° C. for glasses rich in LiI) also makes it possible to envisage putting a continuous film of softened glass into use by hot compression. Another way of applying the invention is to associate the powdered glass with a binder which promotes compacting and cohesion of the mixture. Halides of lithium, for example, are included among the binders which can be used, which halides have the advantage of being themselves conductors of lithium ions, although to a lesser extent than glasses in accordance with the invention. As seen above, the glass-crystallized lithium halide mixture can advantageously be obtained by inserting an excess of halide when the glass is being prepared.

We claim:

1. A cation conductive solid electrolyte for an electrochemical generator, the electrolyte being a vitreous composition of general formula $aP_2S_5$, $bLi_2S$, $cLiX$, where X is an element chosen from the group consisting of chlorine, bromine and iodine and where a, b and c are numbers chosen so that the ratio $b/(a+b)$ lies in the range 0.61 to 0.70 and the ratio $c/(a+b+c)$ is less than or equal to a limit value corresponding to the maximum solubility in the vitreous phase of LiX in the composition $aP_2S_5$, $bLi_2S$.

2. A compound according to claim 1, wherein X is bromine and said limit value is 0.20.

3. A compound according to claim 1, wherein X is iodine and said limit value is 0.50.

4. An electrochemical generator comprising:
a negative electrode in which the active material is lithium;
a positive electrode in which the active material is selected from the group consisting of $MoO_3$, $WO_3$, $TiS_2$, $NiPS_3$, a bismuthate of copper, and a bismuthate of lead; and
an electrolyte which is a cation conductive vitreous composition of general formula $aP_2S_5.bLi_2S.cLiX$, where X is an element chosen from the group consisting of chlorine, bromine, and iodine and where a, b, and c are numbers chosen so that the ratio $b/(a+b)$ lies in the range 0.61 to 0.70 and the ratio $c/(a+b+c)$ is less than or equal to the limit value corresponding to the maximum solubility in the vitreous phase of LiX in the composition $aP_2S_5.bLi_2S$.

5. An electrochemical generator according to claim 4, wherein X is bromine and said limit value is 0.20.

6. An electrochemical generator according to claim 4, wherein X is iodine and said limit value is 0.50.

* * * * *